United States Patent [19]

Dew et al.

[11] Patent Number: 4,947,007
[45] Date of Patent: Aug. 7, 1990

[54] SUPERCONDUCTING TRANSMISSION LINE SYSTEM

[75] Inventors: Michael W. Dew, La Jolla; Richard L. Creedon, San Diego, both of Calif.

[73] Assignee: General Atomics, San Diego, Calif.

[21] Appl. No.: 268,598

[22] Filed: Nov. 8, 1988

[51] Int. Cl.$^5$ ............................................. H01B 12/00
[52] U.S. Cl. ................................ 174/15.5; 174/15.4; 307/147; 505/885; 505/886
[58] Field of Search ............... 174/15.4, 15.5, 125.1; 505/886, 887, 888, 885; 307/147

[56] References Cited

U.S. PATENT DOCUMENTS

| | | | |
|---|---|---|---|
| 3,301,937 | 1/1967 | Burnier et al. | 174/15.5 X |
| 3,343,035 | 9/1967 | Garwin | 174/15.5 X |
| 3,562,401 | 2/1971 | Long | 174/15.5 |
| 3,646,243 | 2/1972 | Graneau et al. | 505/886 X |
| 3,686,423 | 8/1972 | Doose et al. | 174/15.5 |
| 3,697,665 | 10/1972 | Doose et al. | 505/886 X |
| 3,708,606 | 1/1973 | Shattes et al. | 174/15.5 |
| 3,735,018 | 5/1973 | Griesinger | 174/15.5 X |
| 3,749,811 | 7/1973 | Bogner et al. | 505/886 X |
| 4,551,633 | 11/1985 | Winter et al. | 307/147 |

FOREIGN PATENT DOCUMENTS 19229  9/1963  Japan .................................. 174/15.5

OTHER PUBLICATIONS

Haga, K. et al., Development of a Liquid-Nitrogen-Cooled Power Cable; IEEE Conference, Dallas, Tex; 1974, Underground Transmission and Distribution Conference 1st-5th Apr. 74; pp. 541-549.

"The Results of Work Carried Out in the USSR on Creation of Superconducting and Cryoresistive Cables for Electric Power Lines", Meshchanov et al., IEEE Transactions on Magnetics, vol. MAG-19, No. 3, May 1983, pp. 662-667.

Semiflex Brochure (LN$_2$ Vacuum Insulated Pipe Systems), p. 15, produced by Vacuum Barrier Corporation.

"The Principles Behind Philips' Liquid Nitrogen Plants ...", from Philips LN$_2$ Liquefier Catalog, Eindhoven, Holland.

"Cryogenic Power Transmission", S. H. Minnich et al., Cryogenics, Jun. 1988, pp. 165-176.

"Conceptual Design and Economic Analysis of a Superconducting AC Power Cable System", Eigenbrod et al., IEEE Transactions on Power Apparatus and Sys- (List continued on next page.)

Primary Examiner—Morris H. Nimmo
Attorney, Agent, or Firm—Fitch, Even, Tabin & Flannery

[57] ABSTRACT

A superconducting transmission line system for transferring electrical power over long distances. The system includes a superconducting transmission line extending from a first location where power is supplied to the line to a second location where electrical power is taken from the line. The line includes an inner tube, and a superconducting core positioned inside the tube and spaced from the inner surface of the tube. The core and the inner tube define a passageway for a cryogenic liquid, the boiling temperature of which is above the superconducting transition temperature of the core. The transmission line system also includes a number of spaced supports holding the transmission line with the portion of the transmission line extending between a pair of adjacent supports being lower than the parts of the line held by the pair of adjacent supports. A regenerator for the cryogenic liquid is mounted on each of the pair of supports. Each regenerator is connected to the transmission line and each operates to reliquefy gases resulting from boiling of the cryogenic liquid in the portion of the transmission line so that gasses resulting from the boiling of the cryogenic liquid due to conductive or radiative heat transfer percolate to the regenerators where they are reliquified and returned to the transmission line thereby maintaining the superconductive core below its transition temperature. A method of maintaining the superconductive core in a transmission line extending over a long distance, below its transition temperature, is also disclosed.

10 Claims, 2 Drawing Sheets

OTHER PUBLICATIONS tems, vol. PAS-89, No. 8, Nov.-Dec. 1970, pp. 1995-2005.

"Practical conclusions from Field Trials of a Superconducting Cable", P. A. Klaudy et al., IEEE Transactions on Magnetics, vol. MAG-19, No. 3, May 1983, pp. 656-661.

"Current Test of a DC Superconducting Power Transmission Line", Edeskuty et al., IEEE Transactions on Magnetics, vol. MAG-17, No. 1, Jan. 1981, pp. 161-164.

"Cryo-Electric Testing of a 1000 MVA Superconducting Power Transmission System", E. B. Forsyth, Advance in Cryogenic Engineering, vol. 29, proceedings of CEC, Colorado Springs, pp. 113-122.

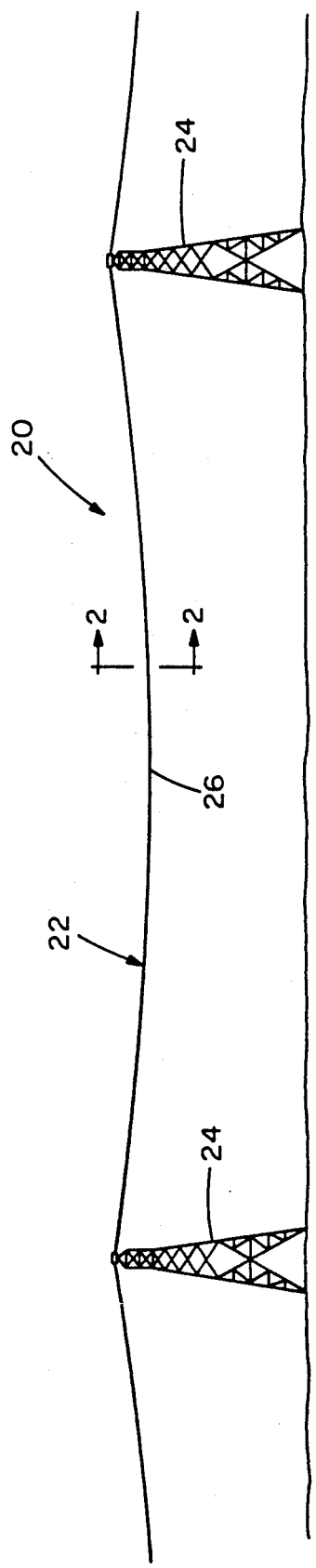
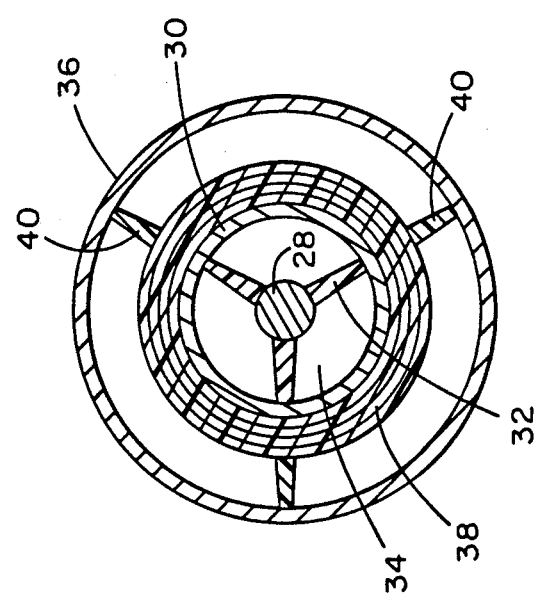
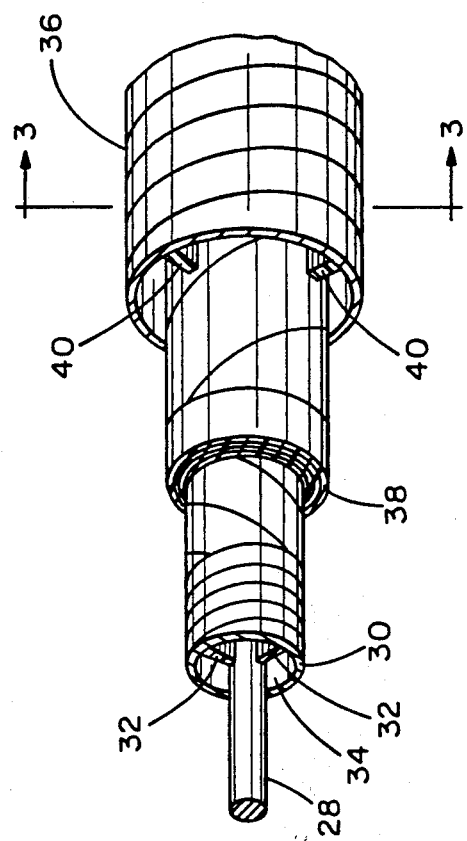

SUPERCONDUCTING TRANSMISSION LINE SYSTEM

This invention relates to the transmission of electrical power and, more specifically, to the use of a superconducting line for transmitting the electrical power.

BACKGROUND OF THE INVENTION

There has been considerable interest in the design and construction of a superconducting transmission line system over the last quarter century. Because the resistance of a superconductor cooled below its superconducting transition temperature is zero for direct current, the power can be transmitted without $I^2R$ loss, making such a system very attractive because of its high efficiency. Conceptual designs and studies have been performed, and actual prototype systems have been built and tested. Such prior system have typically used superconducting material with a transition temperature far below the boiling point of liquid nitrogen (77 K.), thus requiring the use of liquid helium which is very expensive.

Major projects using short lengths of superconducting transmission line have been built and tested at Brookhaven, Upton, N.Y.; LASL, Los Alamos, N.Mex.; and ATF, Graz, Austria. Each project used a helium liquefier providing helium which was pumped into the line. For further information concerning the structure and operation of each project, reference may be made to "Cryo-Electric Testing of a 1000 MVA Superconducting Power Transmission System", Forsyth, *Advances In Cryogenic Engineering,* Proceedings of CEC, Colorado Springs, Vol. 29, 1983, pp. 113-121; "Current Test of a DC Superconducting Power Transmission Line", Edeskuty et al., *IEEE Transactions on Magnetics,* Vol. MAG-17, No. 1, June 1981, pp. 161-164; and "Practical Conclusions From Field Trials Of A Superconducting Cable", Klaudy et al., *IEEE Transactions on Magnetics,* Vol. MAG-19, No. 3, May 1983, pp. 656-661.

Cryoresistive cables have also been proposed for electric power distribution. The cores of such cables, while not superconducting, have decreased resistance with decreased operating temperature. An example of such cable includes a liquid nitrogen cooled aluminum conductor with its design patterned after a conventional oil-cooled hollow aluminum cable in which oil is pumped through the cable. For further information concerning the structure and operation of such cryoresistive cables, reference may be made to "Cryogenic Power Transmission", Minnich et al., *Cryogenics,* June 1969, pp. 165-176, and "The Results Of Work Carried Out In The USSR On Creation Of Superconducting And Cryoresistive Cables for Electric Power Lines", Meshchanov et al., *IEEE Transactions On Magnetics,* Vol. MAG-19, No. 3, May 1983, pp. 662-667.

SUMMARY OF THE INVENTION

Among the several aspects and features of the present invention may be noted the provision of an improved superconducting transmission line system capable of carrying electrical power over large distances. The superconducting line includes a core of one of the recently-developed superconducting materials having a transition temperature above the boiling temperature of liquid nitrogen. The transmission line is supported so that it is divided into a series of portions extending as catenary curves. Gasses resulting from boiling of the liquid nitrogen cooling the core percolate to the high points in the line where they are reliquefied and returned to the line to maintain the core below its superconducting transition temperature. Additionally, fresh liquid nitrogen is added at certain high points in the line to replace nitrogen gas which has leaked away. The transmission line of the present invention is reliable in use, has long service life and is relatively easy and economical to manufacture. Other aspects and features of the present invention will be in part apparent and in part pointed out hereinafter in the following specification and accompanying drawings.

Briefly, a superconducting transmission line system embodying various aspects of the present invention includes a superconducting transmission line including an inner tube and a superconducting core positioned inside the tube and spaced from the tube with the core and tube defining a passageway for liquid nitrogen. The superconducting material forming the core has a transition temperature above the boiling point of liquid nitrogen. A large number of spaced supports hold the transmission line with portions of the line extending between pairs of adjacent supports being lower than corresponding parts of line held by the pairs of supports. Certain of the supports carry regenerators for the liquid nitrogen with each regenerator being connected to the transmission line and operating to reliquefy gasses resulting from boiling of the liquid nitrogen. Other of the supports carry a liquefier also connected to the transmission line and operating to supply additional liquid nitrogen to the line to replace gasses resulting from boiling of liquid nitrogen which have leaked from the line. The number of supports carrying the regenerators is much larger than those carrying the liquefiers.

BRIEF DESCRIPTION OF THE DRAWINGS

FIG. 1 shows a portion of a superconducting transmission line system, including a number of spaced towers with a transmission line extending in a catenary between adjacent towers, embodying various aspects of the present invention;

FIG. 2 is a perspective view of a portion of the superconducting transmission line of FIG. 1 with the progressive removal of outer components to expose inner components;

FIG. 3 is a transverse cross sectional view of the superconducting transmission line of FIG. 1;

Corresponding reference characters indicate corresponding parts throughout the several views of the drawings.

DESCRIPTION OF THE PREFERRED EMBODIMENT

Figure 4:
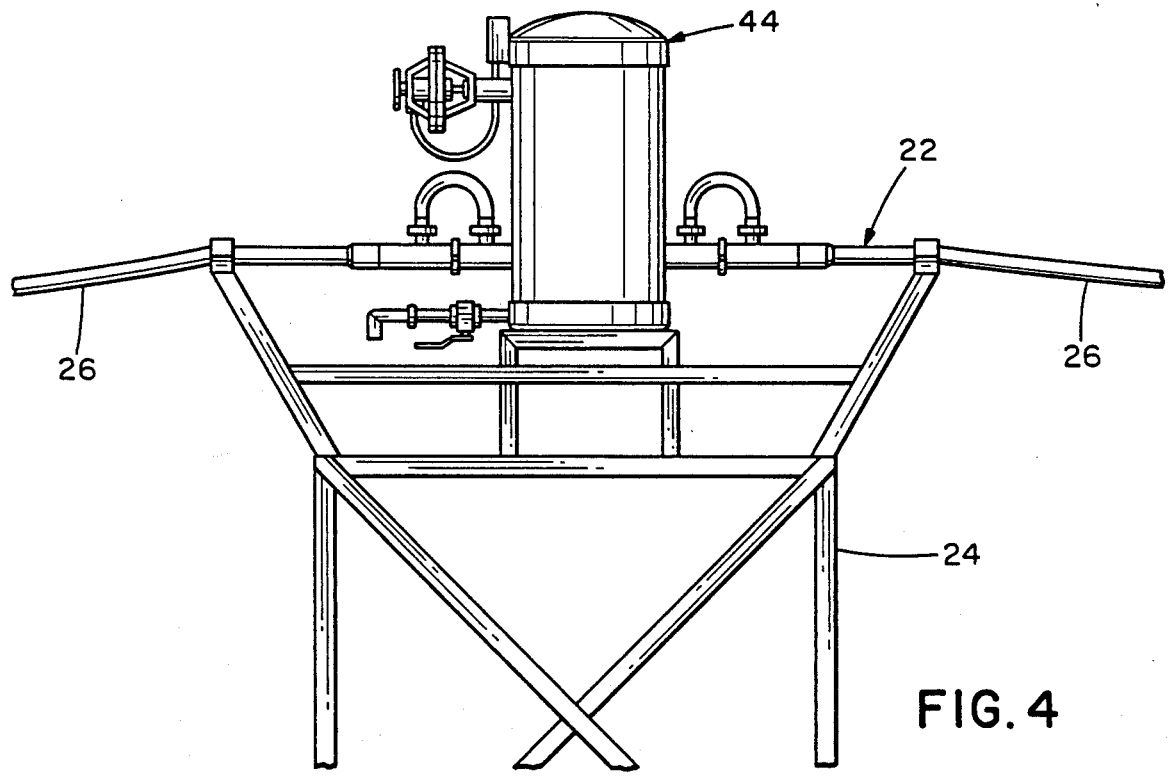
FIG. 4 is a front elevational view of one of the towers supporting a nitrogen gas regeneraqtor (or reliquefier) connected to the transmission line for reconverting nitrogen gas forming within the transmission line back to liquid nitrogen.

Referring now the drawings, a portion of a superconducting transmission line system embodying various aspects of the present invention is generally indicated in FIG. 1 by reference character 20. The system 20 includes a superconducting transmission line 22 extending from a first location where electrical power is supplied to the line to a second location where power is taken from the line. The system also includes a large number of spaced supports 24 holding the line above the ground so that the portion 26 of the transmission line extending between a pair of adjacent supports is lower than the parts of the line held by the pair of supports. The line extends over a long distance, hundreds of miles, and the supports, which could be steel towers, may be located every 1000 feet. The line 22, which is flexible, is preferably without support between the towers so that the line portion 26 forms a catenary curve.

As best shown in FIGS. 2 and 3, the line 22 includes a superconducting core 28 disposed inside an inner tube 30 with regularly spaced supports 32 holding the core centered so that the core and the inner tube define a passageway 34 for cryogenic liquid. The core 28 preferably includes material of the recently-discovered type having a superconducting transition temperature above the boiling point of liquid nitrogen (77 Kelvin). Among such cores are ceramic wires braided into a metallic conductor, ceramic wires embedded in a copper matrix, powdered superconducting material filling a copper tube, or deposited superconducting material on the surface of a copper tube or strip. With such a high transition temperature superconductor, inexpensive liquid nitrogen can be used as the cryogenic liquid. The inner tube 30 is preferably formed of copper or aluminum.

The line 22 also includes an outer jacket 36, preferably formed of stainless steel, positioned about the inner tube 30 with thermal insulation disposed therebetween. This thermal insulation includes a number of layers 38 (20-30) of so-called "superinsulation" positioned on the inner tube. This insulation can be formed by the vacuum deposition of aluminum on mylar to form a radiation shield. A number of radially spaced supports 40 between the layers 38 of the outer jacket define a vacuum space 42 providing additional insulation. The supports 40 are preferably made of G-10 fiberglass/epoxy. The inner tube 30 forms an 80 K. shield while the outer jacket 36 forms a 300 K. shield.

Referring to FIG. 4, mounted near the top of most of the towers 24 is a regenerator 44 which is connected to the transmission line 22. The regenerator operates to reliquefy gasses resulting from boiling of the liquid nitrogen in the passageways 34 of the line portions 26 connected to the regenerator. The reliquefied nitrogen is then returned to the passageway 34. Such a reliquefier can be formed using a liquid/vapor separator available from the Vacuum Barrier Corporation of Woburn, Mass. Within this vacuum insulated phase separator is a closed-cycle helium gas Stirling-cycle refrigerator which reliquefies the nitrogen gasses which percolate up through the transmission line. The refrigerator could be solar powered, it could obtain power by tapping the transmission line, or a combination of the two could be employed.

Figure 5:
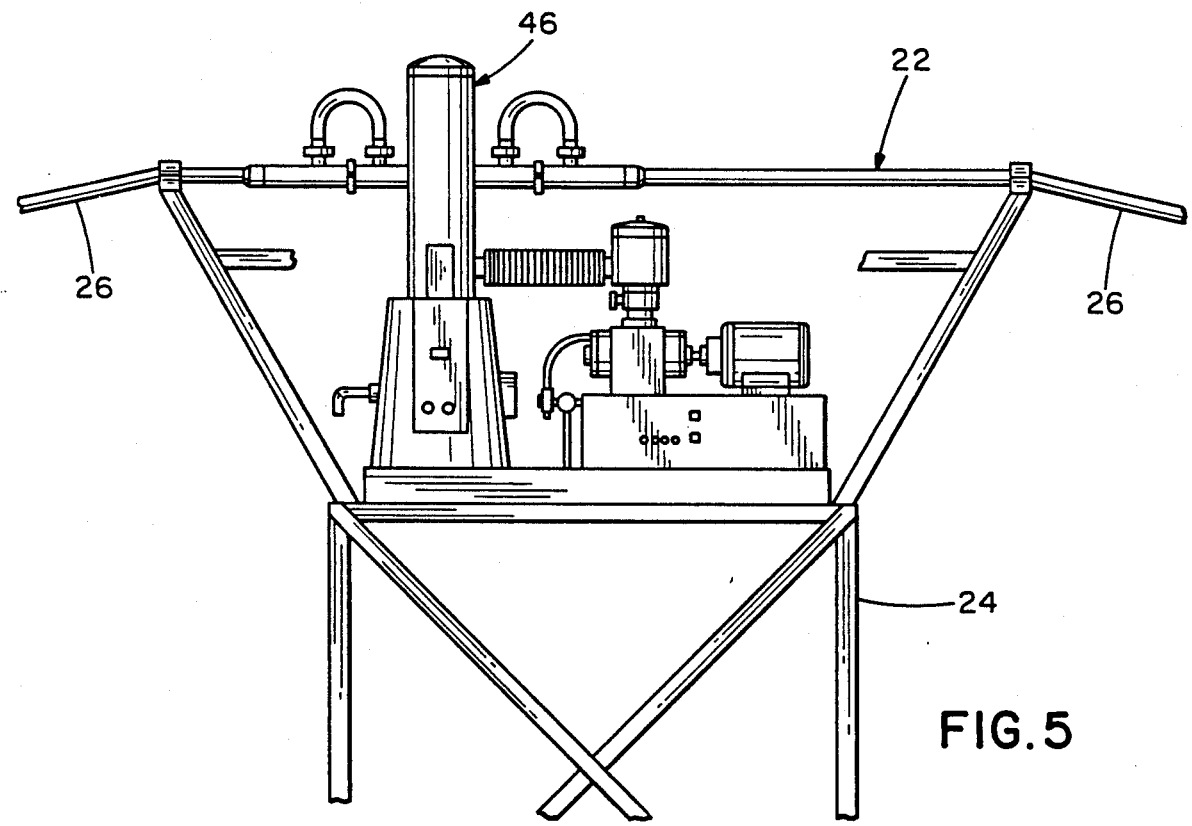
FIG. 5 is a front elevational view of one of the towers supporting a nitrogen liquefier to supply additional liquid nitrogen to the transmission line to replace nitrogen gas which leaked away.

About every mile a tower 24 could carry a nitrogen liquefier 46 also connected to the transmission line 22, as shown in FIG. 5. The liquefiers 46 operate to add new liquid nitrogen to the transmission line to replace gasses resulting from boiling of the liquid nitrogen which have leaked from the line. While most of the towers mount the regenerator 44, a liquefier 46 should be employed about every 50 towers to replenish the system or provide fresh liquid for regenerators 44 not working properly or portions of the line with a "soft" vacuum. An example of such a nitrogen liquefier is Model PLN106S, available from Philips of Eindhoven, Holland. The liquefiers can be powered as discussed above with respect to the regenerator.

It will be appreciated that the transmission line system 20 requires very little maintenance and should be reliable in maintaining the core 28 below its transition temperature to transmit dc with no $I^2R$ losses, or much more efficient transmission of ac than with conventional transmission lines. As the regenerators or liquefiers are mounted at the tops of the transmission line, the nitrogen gasses percolate upwardly and the liquid nitrogen moves downwardly due to their differences in density. Thus the need for pumping liquid nitrogen through the passageway 34 from one end to the other end is precluded.

As shown in FIG. 1, the inner tube 30 is the reservoir for liquid nitrogen and is supported in the outer jacket by means of the G-10 fiberglass supports 40. The annular gap between the inner tube and outer jacket contains the layers 38 of superinsulation and forms a vacuum space to insulate the $LN_2$-filled line from the environment.

Thermal losses are from conductive heat through the G-10 supports and radiation heat inleak from the 300 K. outer jacket 36 through the superinsulation to the 80 K. inner line.

As an example, the supports 40 may be longitudinally spaced 1.5 m apart, are made from G-10 fiberglass/epoxy, and have a cross-sectional area of 0.5 in.$^2$ and a radial length of 1.0 inch. The heat leak per meter of line length from conduction through the supports, according to Fourier's law of heat conduction, is:

$$Q_{cond} = \frac{\left(\frac{A}{L}\right)\left[\int_{80}^{300} kdT\right]_{G-10}}{1.5 \text{ m}}$$

where:

$$\left[\int_{80}^{300} kdT\right]_{G-10} = 1.28 \frac{W}{cm}$$

$$Q_{cond} = 0.10 \frac{W}{m}$$

where:
A = area of the supports 40, m$^2$
L = radial length of the support, m
k = thermal conductivity of the G-10 (which varies with temperature)
$Q_{cond}$ = conductive heat in-leak per unit length of line, (Watts/m).

The radiation heat leak from the 300 K. jacket through the superinsulation to the 80 K. line is:

$$Q_{rad} = 0.25 \frac{W}{m}$$

which is based on radiation heat flux that falls between 0.50 and 1.0 W/m$^2$.

Therefore, the total heat leak to the liquid nitrogen is:

$$Q_{total} = Q_{cond} + Q_{rad} = 0.35 \frac{\text{Watts thermal}}{\text{meter}}$$

This is on the order of typical losses for commercially available vacuum-jacketed liquid nitrogen transfer piping, and does not include additional losses that will be in the line. These additional losses will exist at discrete points along the line, such as end terminations, joints in the superconductor, phase separators where liquefiers are connected, etc. For long lines, the discrete losses will be much less than the continuous losses, and will not be considered in this calculation.

To make a comparison of the thermal losses of the superconducting line with the resistive losses of a conventional line, the following example is used.

A conventional line 500 miles long with a capacity of 500 MVA at 345 kV is assumed. Power losses for this line are 23% and have been calculated as follows:

$$\text{Power Loss} = \frac{(\text{Power Rating})^2}{(\text{Voltage})^2} (R)$$

$$= \frac{S^2}{V^2} \cdot R$$

$$= \frac{(500 \times 10^6)^2}{(345 \times 10^3)^2} \left( .1099 \frac{\Omega}{\text{mi}} \right)(500 \text{ mi})$$

$$\text{Power Loss} = 115 \text{ MW}$$

$$\text{Percent Loss} = \frac{115 \text{ MW}}{500 \text{ MW}} = 23\%$$

$$\text{Power Loss per Meter} = \frac{115 \times 10^6 \text{ W}}{500 \text{ mi}} \times \frac{1 \text{ mi}}{1609 \text{ m}}$$

$$\text{Power Loss per Meter} = 143.0 \frac{\text{Watts electrical}}{\text{meter}}$$

The electrical power requirement to keep the superconducting line filled with liquid nitrogen is the power required to liquefy the boil-off gas. For a practical nitrogen liquefier the refrigeration ratio (W input/W load) is approximately 8. Therefore, the electrical watts per meter required by the superconducting line is:

$$\left( 8.0 \frac{W_e}{W_t} \right)\left( 0.35 \frac{W_t}{\text{m}} \right) = 2.8 \frac{W_e}{\text{m}}$$

The power saved by a superconducting line over a conventional line in this example is:

$$\text{Power Savings} = (143 - 2.8) = 140.2 \frac{W_e}{\text{m}}$$

As a method of maintaining a superconducting core 28 of a transmission line 22 below its superconducting transition temperature, the present invention includes several steps.

(a) Nitrogen gasses resulting from the boiling of the liquid nitrogen inside the portions 26 of the transmission line are reliquefied at certain of the supports 24 with the resulting liquid nitrogen being replaced in the line; and (b) Additional liquid nitrogen is supplied at other of the supports to replace gasses resulting from boiling of the liquid nitrogen and which have leaked from the line.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A superconducting transmission line system for transferring electrical power over long distances, said system comprising:

a superconducting transmission line extending from a first location where electrical power is supplied to said line to a second location where electrical power is taken from said line, said line including an inner tube, a superconducting core positioned inside said tube and spaced from the inner surface of said inner tube with said core and said inner tube defining a passageway for a cryogenic liquid the boiling temperature of which is above the superconducting transition temperature of said core;

a plurality of spaced support means holding said transmission line, the portion of said transmission line extending between a pair of adjacent support means being lower than the parts of said line held by said pair of adjacent support means;

a cryogenic liquid in said passageway with at least a portion of said core being immersed in said liquid; and a regenerator for the cryogenic liquid mounted on each of said pair of support means, each regenerator being connected to said transmission line and each regenerator functioning to reliquefy gasses resulting from boiling of said cryogenic liquid in said portion of said transmission line whereby gasses resulting from boiling of the cryogenic liquid due to conductive or radiative heat transfer percolate to the regenerators where the gasses are reliquefied and returned to the transmission line to maintain the superconductive core below its transition temperature.

2. A superconducting transmission line system as set forth in claim 1 wherein said line further comprises an outer jacket disposed about said inner tube and thermal insulation means between said jacket and said tube.

3. A superconducting transmission line system as set forth in claim 1 wherein the superconducting transition temperature of said core is above 65 Kelvin and wherein said cryogenic liquid is liquid nitrogen at 1. atmosphere or sub-cooled liquid nitrogen below 1. atmosphere.

4. A superconducting transmission line system as set forth in claim 1 wherein each of said support means comprises a discrete support holding said line above ground level.

5. A superconducting transmission line system as set forth in claim 1 further comprising a cryogenic liquefier mounted on at least one of said support means, said liquefier being connected to said transmission line and functioning to supply additional cryogenic liquid to said line to replace gasses resulting from boiling of cryogenic liquid which have leaked from said line.

6. A superconducting transmission line system as set forth in claim 5 wherein one of said regenerators and liquefiers is mounted on each of said support means.

7. A superconducting transmission line system as set forth in claim 6 wherein a plurality of support means carrying regenerators are disposed between each pair of support means carrying liquefiers.

8. A transmission line as set forth in claim 1 wherein said portion of said transmission line forms a catenary curve.

9. A superconducting transmission line system for transferring electrical power over long distances, said system comprising:

a superconducting transmission line extending from a first location where electrical power is supplied to said line to a second location where electrical power is taken from said line, said line including an inner tube, a superconducting core positioned inside said tube and spaced from the inner surface of said inner tube with said core and said inner tube defining a passageway for a cryogenic liquid the boiling temperature of which is above the superconducting transition temperature of said core;

a plurality of spaced support means holding said transmission line, the portion of said transmission line extending between a pair of adjacent support means being lower than the parts of said line held by said pair of adjacent support means; and a regenerator for the cryogenic liquid mounted on each of said pair of support means, each regenerator being connected to said transmission line and each regenerator functioning to reliquefy gasses resulting from boiling of said cryogenic liquid in said portion of said transmission line whereby gasses resulting from boiling of the cryogenic liquid due to conductive or radiative heat transfer percolate to the regenerators where the gasses are reliquefied and returned to the transmission line to maintain the superconductive core below its transition temperature, said line further comprising an outer jacket disposed about said inner tube and thermal insulation means between said jacket and said tube, said thermal insulation means comprising a plurality of layers of insulation on said inner tube and a plurality of spacers holding said inner tube centered with respect to said outer jacket, said tube and jacket defining a vacuum space.

10. A superconducting transmission line system for transferring electrical power over long distances, said system comprising:

a superconducting transmission line extending from a first location where electrical power is supplied to said line to a second location where electrical power is taken from said line, said line including an inner tube, a superconducting core positioned inside said tube and spaced from the inner surface of said inner tube with said core and said inner tube defining a passageway;

a cryogenic liquid, the boiling temperature of which is above the superconducting transition temperature of said core, disposed in said passageway with at least a portion of said core being immersed in said liquid;

a plurality of spaced support means holding said transmission line, the portion of said transmission line extending between a pair of adjacent support means being lower than the parts of said line held by said pair of adjacent support means; and a regenerator for the cryogenic liquid mounted on each of said pair of support means, each regenerator being connected to said transmission line and each regenerator functioning to reliquefy gasses resulting from boiling of said cryogenic liquid in said portion of said transmission line whereby gasses resulting from boiling of the cryogenic liquid due to conductive or radiative heat transfer percolate to the regenerators where the gasses are reliquefied and returned to the transmission line to maintain the superconductive core below its transition temperature, said line further comprising an outer jacket disposed about said inner tube and thermal insulation means between said jacket and said tube, said thermal insulation including a plurality of spacers holding said inner tube centered with respect to said outer jacket, said tube and jacket defining a vacuum space.

* * * * *

UNITED STATES PATENT AND TRADEMARK OFFICE
CERTIFICATE OF CORRECTION

PATENT NO. : 4,947,007
DATED : August 7, 1990
INVENTOR(S) : Michael W. Dew et al.

It is certified that error appears in the above-identified patent and that said Letters Patent is hereby corrected as shown below:

ON THE TITLE PAGE:  , under Other Publications, Column 1, line 10, change "Semiflex" to --SEMIFLEX--.

On Page 2 of the Face of Patent, under Other Publications, Column 1, line 3, change "conclusions" to --Conclusions--.

On Page 2 of the Face of Patent, under Other Publications, Column 2, line 7, change "proceedings" to --Proceedings--.

Face of Patent, in the "Abstract", line 20, change "gases" to --gasses--.

Column 1, line 19, change "system" to --systems--.
Column 1, line 21, change "(77 K.)" to --(77° K.)--.
Column 2, line 50, change "regeneraqtor" to --regenerator--.
Column 3, line 20, change "(77 Kelvin)" to --(77° Kelvin)--.
Column 3, line 41, change "80 K." to --80° K.--.
Column 3, line 42, change "300 K." to --300° K.--.
Column 4, line 27, change "300 K." to --300° K.--.

UNITED STATES PATENT AND TRADEMARK OFFICE
CERTIFICATE OF CORRECTION

PATENT NO. : 4,947,007  Page 2 of 3

DATED : August 7, 1990

INVENTOR(S) : Michael W. Dew et al.

It is certified that error appears in the above-identified patent and that said Letters Patent is hereby corrected as shown below:

Column 4, line 28, change "80 K." to --80° K.--.

Column 4, line 31, delete bold face type of "1.5".

Column 4, line 33, delete bold face type of "1.0".

Column 4, lines 38-40, in the equation change $$" \ 300 \ " \quad \text{to} \quad -- \int_{80}^{300} --$$

Column 4, line 41, change "$Q_{cond}$" to --$\dot{Q}_{cond}$--.

Column 4, lines 45-47, in the equation change $$" \ 300 \ " \quad \text{to} \quad -- \int_{80}^{300} --$$

Column 4, line 49, change "$Q_{cond}$" to --$\dot{Q}_{cond}$--.

UNITED STATES PATENT AND TRADEMARK OFFICE
CERTIFICATE OF CORRECTION

PATENT NO. : 4,947,007

DATED : August 7, 1990

INVENTOR(S) : Michael W. Dew et al.

It is certified that error appears in the above-identified patent and that said Letters Patent is hereby corrected as shown below:

Column 4, line 59, change "300 K." to --300° K.--.

Column 4, line 60, change "80 K." to --80° K.--.

Column 4, line 63, change "$Q_{rad}$" to --$\dot{Q}_{rad}$--.

Column 5, line 3, change "$Q_{total}$" to --"$\dot{Q}_{total}$--, "$Q_{cond}$" to --$\dot{Q}_{cond}$--; and "$Q_{rad}$" to --$\dot{Q}_{rad}$--.

Column 6, line 51, change "65" to --65°--.

Signed and Sealed this

Second Day of March, 1993

Attest:

STEPHEN G. KUNIN

*Attesting Officer*   Acting Commissioner of Patents and Trademarks